Patented Feb. 2, 1926.

1,571,624

UNITED STATES PATENT OFFICE.

JOHN WILLIAM COBB AND HENRY JAMES HODSMAN, OF LEEDS, ENGLAND.

PURIFICATION OF GAS.

No Drawing. Application filed January 5, 1925. Serial No. 658.

*To all whom it may concern:*

Be it known that we, JOHN WILLIAM COBB and HENRY JAMES HODSMAN, both subjects of the King of Great Britain and Ireland, and both residing at The University, Leeds, in the West Riding of York, England, have invented certain new and useful Improvements in and Relating to the Purification of Gas, of which the following is a specification.

Specification No. 308 was filed in Great Britain on January 4, 1924, covering this same invention.

This invention relates to the purification of gases and more particularly of fuel gas in order to effect the removal of sulphur from such gases by means of a process of the kind in which the partial oxidation of the hydrogen sulphide is secured by the passage of the gas containing sufficient oxygen through or over a hot contact material such as iron oxide.

When the contact materials are used cold their activity is rapidly reduced by sulphiding and the deposition of sulphur and considerable volumes of such materials must be used while the apparatus for containing it and the accessory apparatus occupies much ground space and is costly to install and to operate.

In certain processes of the kind in question which have been proposed for the purification of fuel gas, the contact materials are employed in a heated condition in order that the purifying capacity per unit volume of the contact material may be increased and the material maintained in an active state, the free sulphur being carried forward by the gas and subsequently caused to separate therefrom.

If the contact material is employed at a sufficiently high temperature to allow of its activity being maintained over any considerable period some sulphur dioxide is formed and the removal of the sulphur dioxide, mixed as it is with hydrogen sulphide and free sulphur vapours, is difficult when the gases treated have in accordance with the practice hitherto been previously substantially freed from ammonia while, of course, the presence of sulphur dioxide in gas as ordinarily distributed in metal pipes is fatal.

In our investigations, when using an artificial prepared iron oxide prepared on a technical scale, a temperature in the neighbourhood of 300° C. has been shown to be highly suitable if the bed of iron oxide is to be maintained in an active state for a reasonable period. However, this specific temperature is not necessarily used as with iron oxide containing materials of different origin temperatures not materially exceeding the limits of 250 to 350° C. may be employed. These temperatures are of the same order as those which it has been stated should be employed when pumice, firebrick, broken pottery and the like have been used as the contact material and where also the presence of sulphur dioxide in the gas has been observed.

There is another proposed method of gas purification having for its object the removal of hydrogen sulphide and also carbon dioxide, known as liquid purification, where the impurities are removed by washing the gases with ammonia liquor, but normally the quantity of ammonia obtained would render necessary the recovery of the ammonia from the washing liquid and its re-use and this introduces considerable complications.

The object of the present invention is to provide an improved process of purifying fuel gases relying upon the use of contact materials, such as iron oxide or iron oxide containing materials in a heated state for effecting the partial oxidation of hydrogen sulphide by the free oxygen of the gas.

The invention comprises subjecting the fuel gases to the action of contact materials, such as iron oxide, adapted to secure the partial oxidation of the hydrogen sulphide under conditions of temperature and humidity which will ensure that the free sulphur formed shall be carried forward from the contact bed and that the latter maintains its activity and utilizing ammonia to enable the removal of sulphur dioxide present in the gas after partial oxidation of the hydrogen sulphide to be effected by condensation and washing operations.

In this connection it is to be observed that it is considered desirable to secure merely the oxidation of a proportion of the sulphur compounds in the gas sufficient to ensure the decomposition of the rest with the production of free sulphur. Hence normally the oxygen content of the gas is not raised at all or at most only sufficiently to secure the result above indicated.

Normally the proportion of ammonia present in the gas arising from coal distillation and the like which has merely been treated to effect the removal of tar is more than sufficient for the purpose of the present invention, as while a proportion of the hydrogen sulphide will be decomposed by the hot oxide with the production of free sulphur, only a relatively small amount of sulphur compounds will be present in the gas which has passed through the purifier bed and these will be largely compounds easily fixed by ammonia.

As the proportion of ammonia present in fuel gases which have been merely treated to remove tar is in many instances in excess of that required for the purpose of the invention, the ammonia content of the gas may also be further reduced, sufficient ammonia being, however, left in the gas to ensure that under the conditions in which the treatment with hot iron oxide and the further treatment of the gas is carried out, the acidic oxygen-containing sulphur compounds may be effectively removed.

Precautions to ensure that the contact substance shall be maintained throughout its mass within suitable temperature limits and that the moisture content of the gas is also suitable should be observed. In this connection it may be remarked that the precise degree of humidity of the gas would appear to be of little moment provided that it is not exceptionally low, gas artificially dried by means of drying reagents being less susceptible to the treatment.

After subjecting the gases which have passed through a hot bed of iron oxide to condensing and washing processes, they may be passed through a cold oxide purifier to remove any residual hydrogen sulphide.

The presence in the gas of a considerable or excessive proportion of carbon dioxide hinders the removal by condensation and washing of residual hydrogen sulphide from the gas after passing the contact material but even in such case the removal of the same by treatment with cold iron oxide can be conveniently effected by the employment of a small purifying unit and the purification thus completed.

While in accordance with the invention steps will usually be taken to ensure that the gas passed over or through the heated contact substance contains the proportion of ammonia necessary to enable the sulphur dioxide to be removed by condensation and washing, it is to be understood that the introduction of ammonia into the gases after they have been subjected to the action of the heated contact material is not excluded from the scope of the invention; ammoniacal liquor may be used for this purpose and the partial neutralization of the liquor thus effected is of advantage from the point of view of storage.

The proportion of ammonia arising from the distillation of the usual fuels will be sufficient to enable the purification of the gas to be effected without the necessity for recovering ammonia and re-using it as purifying material and for this reason and for the reason that considerable economy in respect of the treatment by contact material and the plant required for this purpose is ensured the invention presents obvious commercial and technical advantages.

The employment of iron oxide is particularly referred to in the above description but it is to be observed that the invention is not restricted to the use of this material or iron oxide containing materials such as hematite iron ore for the purpose of securing the decomposition of the hydrogen sulphide although iron oxide containing materials appear to be the most satisfactory agents for this purpose.

Having now described our invention, what we claim as new and desire to secure by Letters Patent is:—

The improved process of purifying fuel gases which comprises subjecting the fuel gases to the action of contact materials, adapted to secure the partial oxidation of the hydrogen sulphide under conditions of temperature and humidity which will ensure that the free sulphur formed shall be carried forward from the contact material and that the latter maintains its activity and utilizing ammonia to enable the removal of sulphur dioxide present in the gas after partial oxidation of the hydrogen sulphide to be effected by condensation and washing operations, the ammonia content of the fuel gases being adjusted to ensure that under the conditions in which the treatment with the contact material and the further treatment of the gas is carried out, the acidic oxygen containing sulphur compounds may be effectively removed.

In testimony whereof we have signed our names to this specification.

JOHN WILLIAM COBB.
HENRY JAMES HODSMAN.